Oct. 4, 1932.  W. D. SARGENT  1,881,097
VEHICLE WHEEL
Filed Oct. 15, 1928   2 Sheets-Sheet 2
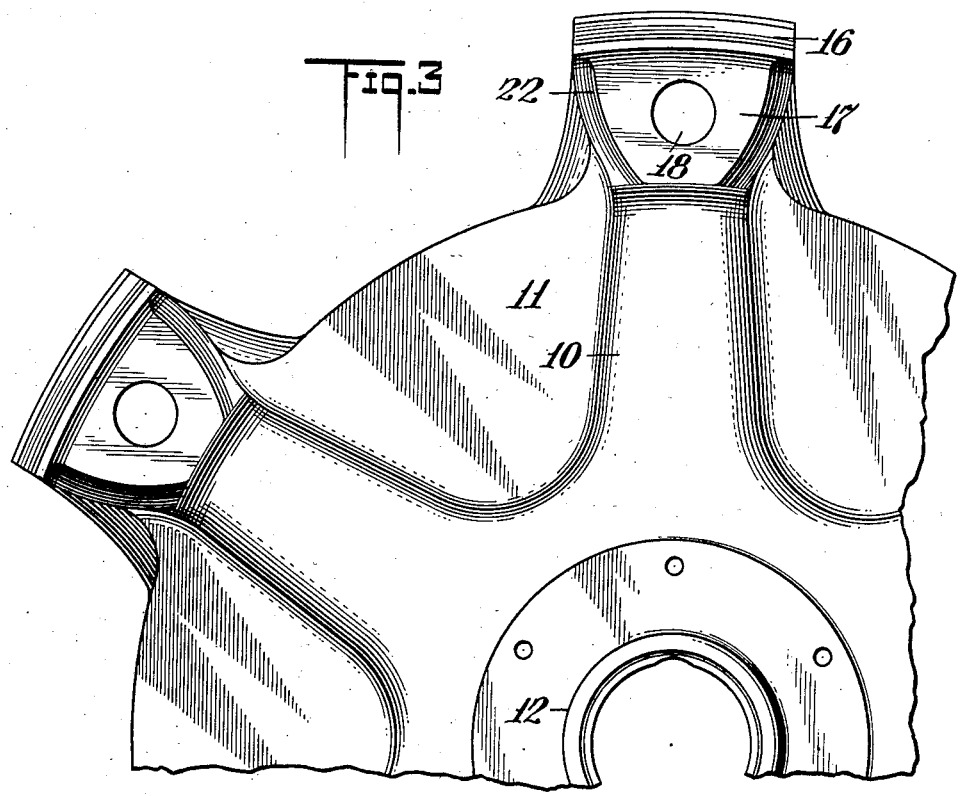
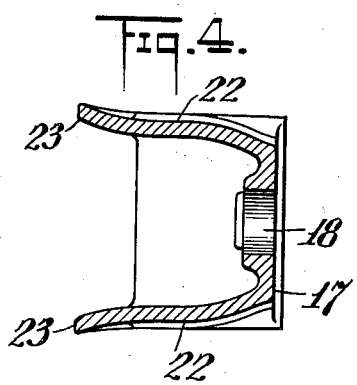
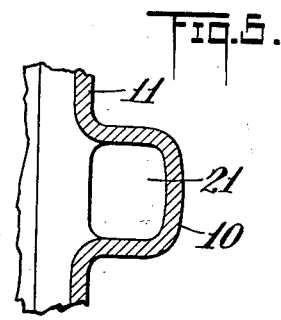
INVENTOR
William D. Sargent
BY
Dean, Fairbank, Albright & Hirsch
ATTORNEYS Patented Oct. 4, 1932

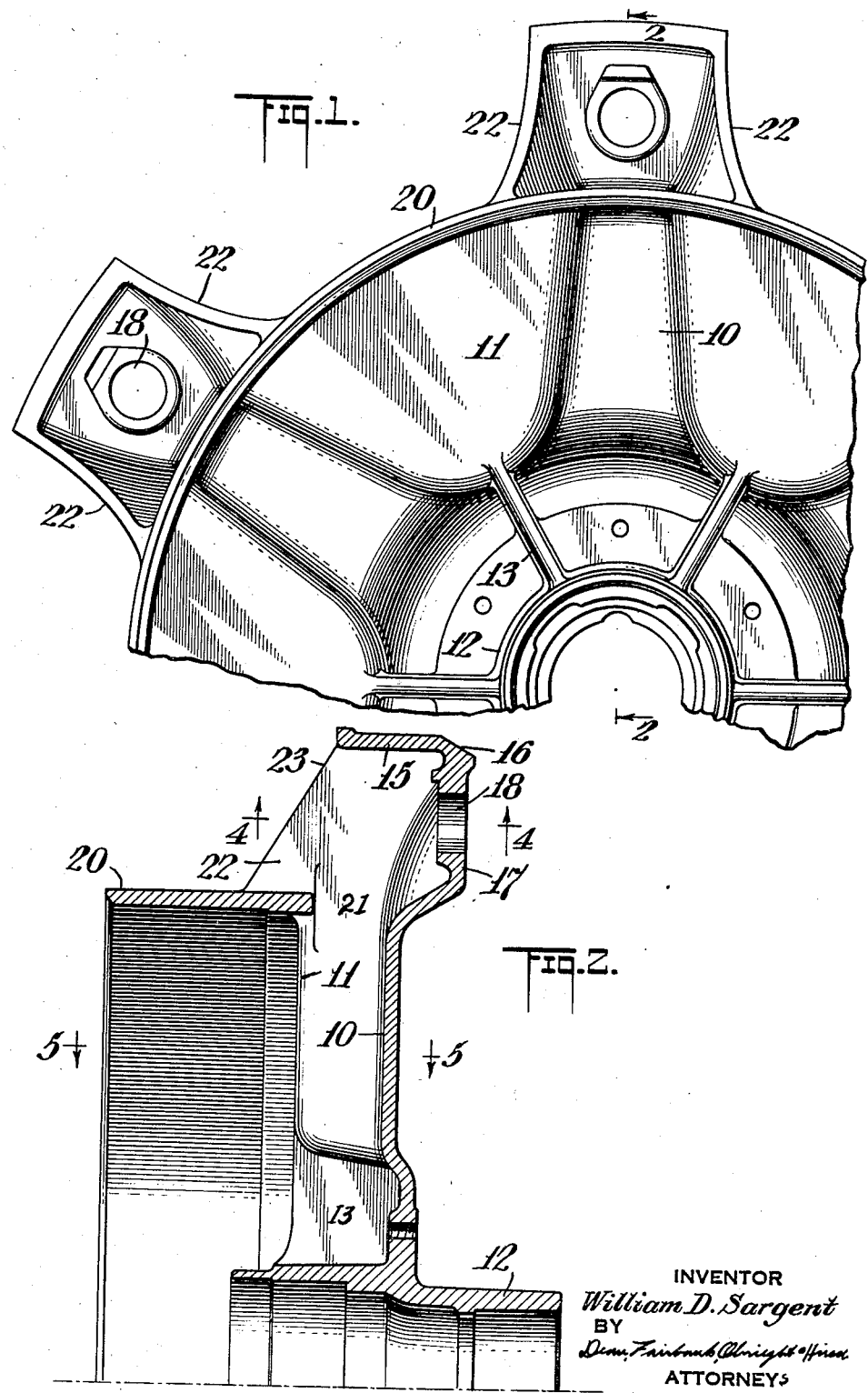

1,881,097

UNITED STATES PATENT OFFICE

WILLIAM D. SARGENT, OF WEST ORANGE, NEW JERSEY

VEHICLE WHEEL

Application filed October 15, 1928. Serial No. 312,565.

This invention relates to vehicle wheels of the type in which there is employed a brake flange. In the usual type of construction a brake drum is employed which includes a brake flange and a supporting web integral therewith, the web being detachably secured to the body of the wheel.

In my invention the brake flange is cast integral with the supporting parts which latter preferably comprise the body portion of the wheel.

I am aware that it has heretofore been proposed to make the wheel body and the brake flange of a single casting, but so far as I am aware no construction of this character has gone into commercial use due to certain difficulties and objections which I have overcome by means of my invention.

The materials which have heretofore been employed for making the brake flange are not suitable for use in making the body portion of the wheel, and the materials employed for making the body of the wheel are not suitable for making the brake flange.

The requirements for the metal employed in making the wheel are good tensile and compressive strength, sufficient toughness to withstand transverse shocks and impact, sufficient fluidity in the metal to form thin sections and complicated designs, freedom from shrink holes and cracks, easy machinability, absolute conformity to the pattern in order to reduce as far as possible finishing operations, and sufficient hardness to resist bolt, key and lug pressure.

Wheels as at present constructed are made of various different types of material, such as wood, forged, rolled or pressed steel, malleable cast iron, and cast steel.

The rolled, forged or pressed steel wheels cannot be shaped into complicated designs, are more difficult to machine than iron, cannot have the hub and disc, or hub and spokes made in one piece, thus requiring extra machining operations before the assembly of the parts. The steel suitable for forming discs or spokes is not of the hardness required to resist the pressure and leverage exerted through attaching bolts at the hub, and the bolt holes become enlarged so that a certain amount of play occurs. The brake flange cannot be formed integral with the hub and web or either of them, and this entails many disadvantages, such as difficulty in dismounting on the hub as compared with the rim, heavier extra equipment is required, extra weight is required in the hub in order to provide for detachment of the disc, and extra weight is required in the brake drum in order to provide for the attachment to the hub.

Malleable cast iron is not as easy to machine as gray cast iron. It must be thoroughly annealed and a certain amount of distortion takes place through this process. It is not sufficiently hard to resist bolt, key and lug pressure, and is entirely unsuited for the making of brake flanges on account of its softness and its lack of homogeneity.

Cast steel is not nearly as fluid as iron, requires high temperature so that shrink cracks and porous metal occur in complicated castings, is not nearly as easy to machine as iron, and because of the shrinkage and the annealing a certain amount of distortion occurs.

For a brake flange it is desirable that there be absolute uniformity of material, granular structure, resistance to compression, resistance to growth, resistance to change of structure under the influence of heat, and rigidity.

A soft rolled steel brake flange is fibrous rather than granular, abrades easily, is subject to changes in structure by heating and rapid cooling, that is it acquires temper or hardening in spots, and it does not have sufficient rigidity. Hard rolled steel is more satisfactory, for brake flanges, but is fibrous rather than granular, and may or may not be dense depending upon treatment during manufacture. Because of its lack of granular structure it does not have the desired rigidity. Cast steel does not give the same uniformity of structure because of different rates of cooling at different parts of the casting and the grain is not as dense as that of iron. So-called gun iron has been used for brake drums, but it is not of absolute uniformity, does not have sufficient resistance to growth, and its structure is liable to change under the influence of heat.

The advantages of forming the brake flange integral with the hub and spokes or the spokes will be readily apparent because of the reduction in the number of finishing and assembling operations, the reduction in weight, the greater strength, and the simplicity of design, but as has been noted, none of the materials heretofore employed for making brake flanges are suitable for making wheels, and none of them employed for making wheels are suitable for making brake flanges.

I have discovered that a cast iron having a substantially pearlitic matrix and a uniform distribution and size of graphite and grain size fulfill all of the requirements for a wheel as well as those for a brake flange and is suitable for use in making a wheel in which the brake flange is cast integral with the wheel.

Tests of such material show a tensile strength of 41,000 pounds per square inch, transverse strength of 74,000 pounds per square inch, and deflection of 0.416 inch between 24 inch supports. This material offers very great resistance to wear, one reason being that the carbon content is much higher than that of steel and the pearlitic structure is much more resistant than the 1/3 pearlitic and 2/3 ferric structure of steel.

As one important feature of my invention I use this material and cast the brake flange and wheel integral. The complete casting may include the hub, spokes felly and brake flange, or if desired, the felly may be made separate or omitted entirely and the hub made separate, whereby the body of the wheel may be secured to various sizes, makes or designs of hub.

As a further important feature I provide a novel design in which the brake flange is integral with the corrugated drum and spoke parts so as to give great strength and promote cooling, both by radiation from the flange and by fan action.

In the preferred construction the side walls of the spoke ends beyond the brake flange are spaced apart to a greater distance than the side walls of the spoke parts between the brake flange and the axis, the first mentioned side walls also flare or diverge in a radial direction toward the axis and also in an axial direction toward the inner side of the wheel. Also they project partway across the surface of the brake flange.

As one advantage of this construction the machining of the hub and the inside of the brake flange can both be accomplished in one operation, and as a consequence the brake flange surface is absolutely concentric with the hub and the cost of machining is greatly reduced. The usual work of facing the contacting surfaces of the wheel and the brake drum, the drilling of holes, and the insertion of bolts is obviated. This result can only be obtained if the metal is strong, dense and of uniform structure and free from shrink holes and cracks, and the design preferably such that the wheel may be cast without a central core.

I have illustrated only one of many embodiments of my invention in the accompanying drawings as many changes may be made within the scope of my invention.

In these drawings:

Fig. 1 is an end view of a portion of the casting looking from the inner side of the wheel;

Fig. 2 is a radial longitudinal section on the line 2—2 of Fig. 1;

Fig. 3 is a view similar to Fig. 1, but from the outside; and

Figs. 4 and 5 are transverse sections on the lines 4—4 and 5—5 respectively of Fig. 2.

I have illustrated my invention as applied to a fellyless type of wheel in which the hub, spokes, web, brake flange and rim supports are cast integral.

So far as concerns the main features of my invention it is not essential that all of these parts are integral. For instance the hub might be made separate and the web designed for detachable connection to various different types of hubs.

As illustrated the wheel includes a series of radial spokes 10 substantially U-shaped in cross-section with adjacent edges of successive spokes connected by a web 11. These spokes and the web are shown as integral with a hub 12, and between successive spokes are webs or walls 13 extending in radial longitudinal planes to connect the inner ends of the side walls of each spoke to the hub, and brace and reinforce the parts.

Each spoke at its outer end is shown as provided with means for the detachable securing of a rim thereon. This includes an outer end wall 15 with a cam surface 16 onto which the rim may be forced, and an outer axially facing wall 17 having an aperture 18 for the reception of some form of rim clamping means.

The wheel is provided with a brake flange 20 which is cast integral with the web and spokes. This is on the inner side of the wheel and of substantially cylindrical form with one edge substantially registering with the outer edge of the web 11 and integral therewith. This edge of the brake flange is spaced from the outside walls of the several spokes so that the channel 21 in each spoke forms a passage from the inner side of the brake flange to the outer side thereof for the circulation of air during the rotation of the wheel.

The outer end of each spoke is made wider than the body portion thereof and has side walls 22 which diverge toward the brake flange so that their inner ends are spaced to a considerable distance apart and thus nearer to the corresponding walls of the adjacent spokes. Thus the radiation of heat from the brake flange is rendered more uniform along the length of the latter. Likewise these walls diverge in an axial direction from the outer side toward the inner side of the wheel as shown particularly in Figs. 1, 3 and 4.

The inner edges 23 of these walls slant inwardly and axially so that they unite with the brake flange at points intermediate of the side edges of the latter so as to also facilitate heat radiation, distribute strain, and further strengthen and reinforce the construction.

It will be noted that each spoke is closed at its outer end by the wall 15. This closing may be effected by a felly cast integral with the spokes or secured thereto, or it may be closed by the detachable rim secured to the outer ends of the spokes in a fellyless wheel.

It will also be noted that the air passages through each spoke open toward the inner side of the wheel at points inside of and outside of the brake flange so that the air will be drawn in from the inside of the brake flange and delivered along the outer surface of the latter due to centrifugal action or fan action in the use of the wheel.

By the use of the pearlitic iron of the type heretofore referred to, the entire wheel may be made of a single casting, the brake drum will meet all of the requirements above referred to as desirable for a brake flange, and the body of the wheel will meet all of the requirements above referred to for such features.

Having thus described my invention, what I claim as new and desire to secure by Letters Patent is:

1. A vehicle wheel including spokes, web and brake flange cast integral, said spokes being substantially U-shaped in cross-section, said web being disposed between said spokes and connecting the open side of each spoke to that of the adjacent one and having its outer edge spaced from the outer ends of the spokes, and said brake flange extending axially from the outer edge of the web, the side walls of each spoke beyond the brake flange being spaced to a greater distance than the corresponding walls between the brake flange and wheel axis.

2. A vehicle wheel including spokes, web and brake flange cast integral, said spokes being substantially U-shaped in cross-section, said web being disposed between said spokes and connecting the open side of each spoke to that of the adjacent one and having its outer edge spaced from the outer ends of the spokes, and said brake flange extending axially from the outer edge of the web, the side walls of each spoke beyond the brake flange diverging in an inwardly radial direction and having their edges out of alignment with the corresponding edges of said walls between the brake flange and wheel axis.

3. A vehicle wheel including spokes, web and brake flange cast integral, said spokes being substantially U-shaped in cross-section, said web being disposed between said spokes and connecting the open side of each spoke to that of the adjacent one and having its outer edge spaced from the outer ends of the spokes, and said brake flange extending axially from the outer edge of the web, the side walls of each spoke diverging in an axial direction to a greater extent than do the corresponding walls between the brake flange and wheel axis.

4. A vehicle wheel including spokes, web and brake flange cast integral, said spokes being substantially U-shaped in cross-section, said web being disposed between said spokes and connecting the open side of each spoke to that of the adjacent one and having its outer edge spaced from the outer ends of the spokes, and said brake flange extending axially from the outer edge of the web, the side walls of each spoke beyond the brake flange being wider than the corresponding walls between said brake flange and the wheel axis, so that said side walls extend in an approximately axial direction across the outer surface of the brake flange.

5. A vehicle wheel having a pluraliy of hollow spokes, and a brake flange extending axially from said spokes intermediate of their ends, the side walls of each spoke beyond the brake flange being spaced to a greater distance than the corresponding walls between the brake flange and wheel axis.

6. A vehicle wheel having a plurality of hollow spokes, and a brake flange extending axially from said spokes intermediate of their ends, the side walls of each spoke beyond the brake flange diverging in an inwardly radial direction and having their edges out of alignment with the corresponding edges of said walls between the brake flange and wheel axis.

Signed at New York in the county of New York and State of New York this 11th day of October A. D. 1928.

WILLIAM D. SARGENT.